R. G. MASON.
DEMOUNTABLE RIM FOR VEHICLE WHEELS.
APPLICATION FILED OCT. 26, 1916.
1,243,087.
Patented Oct. 16, 1917.
8 SHEETS—SHEET 4.
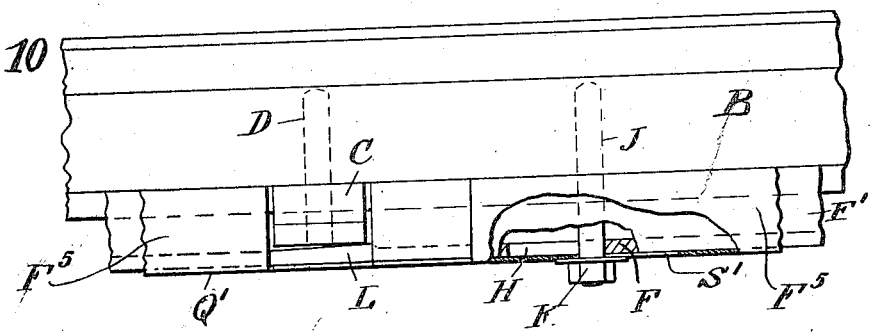
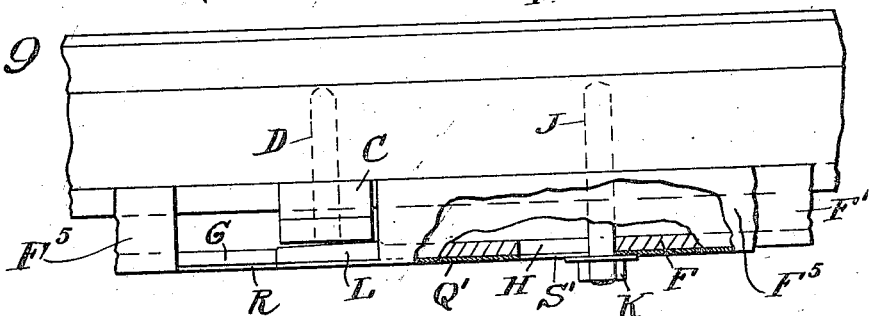
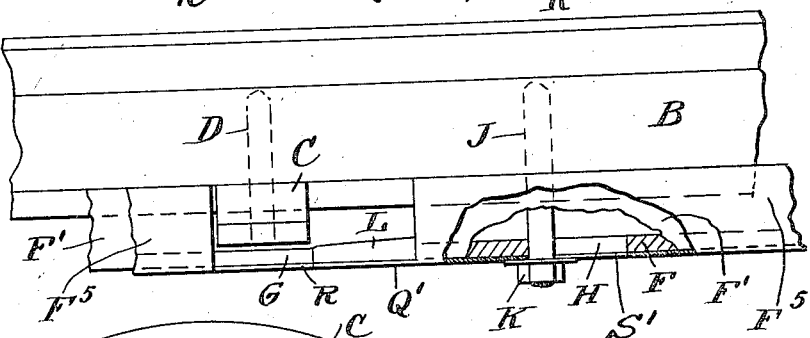
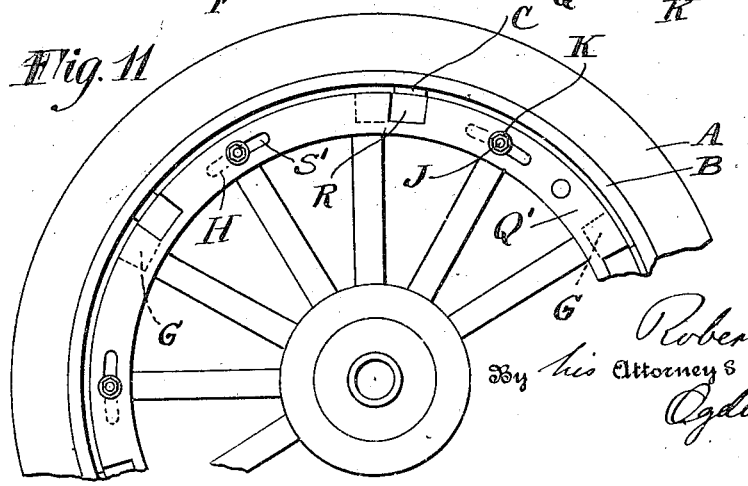

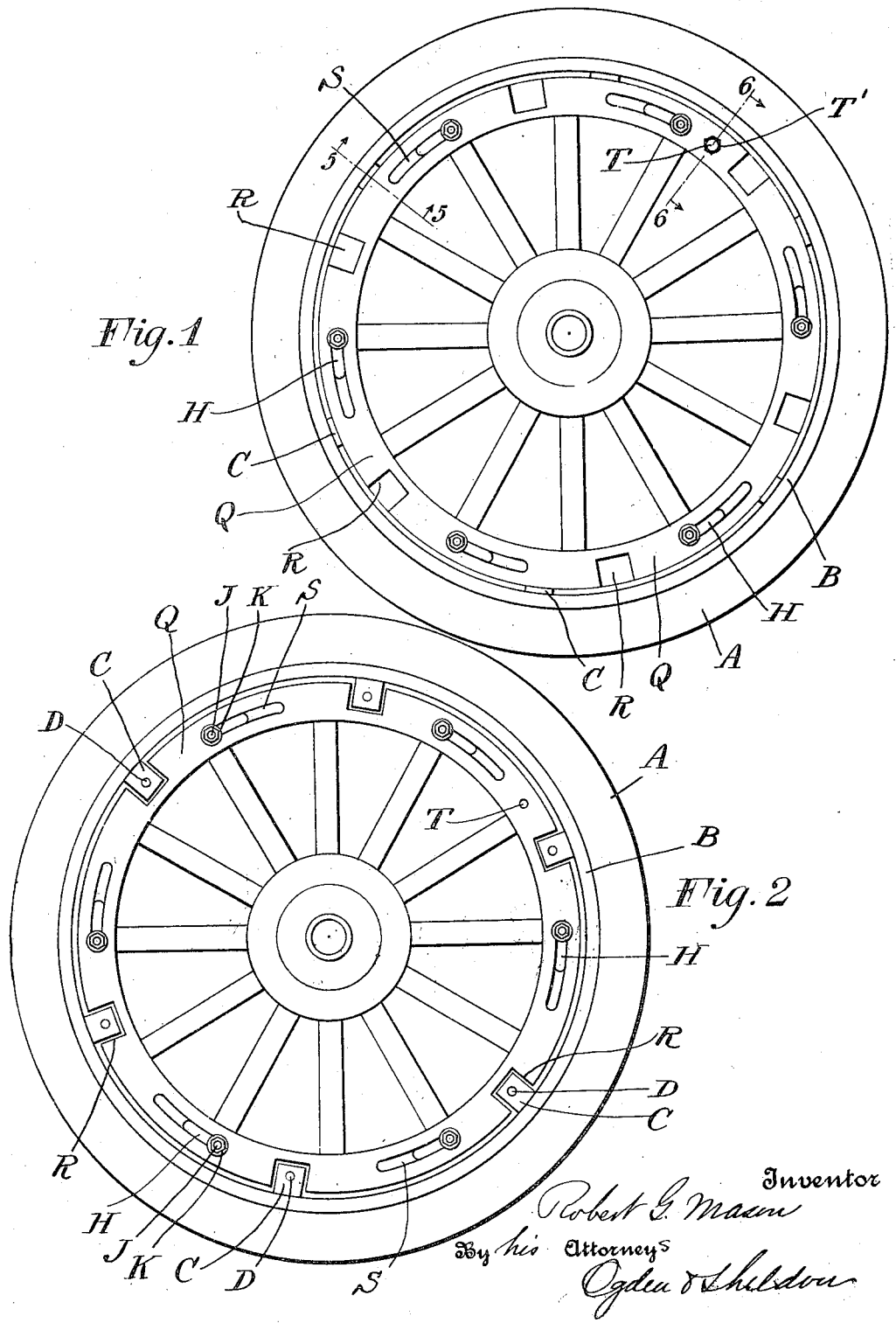

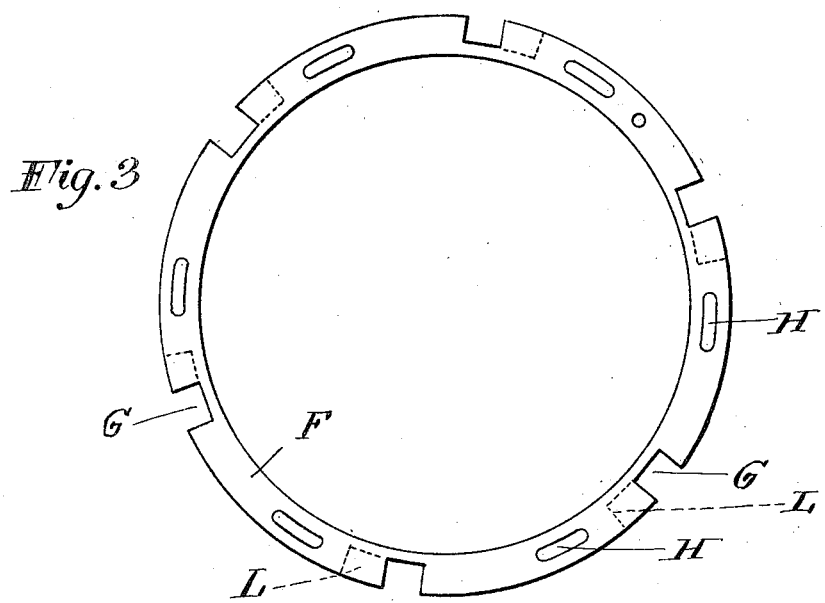
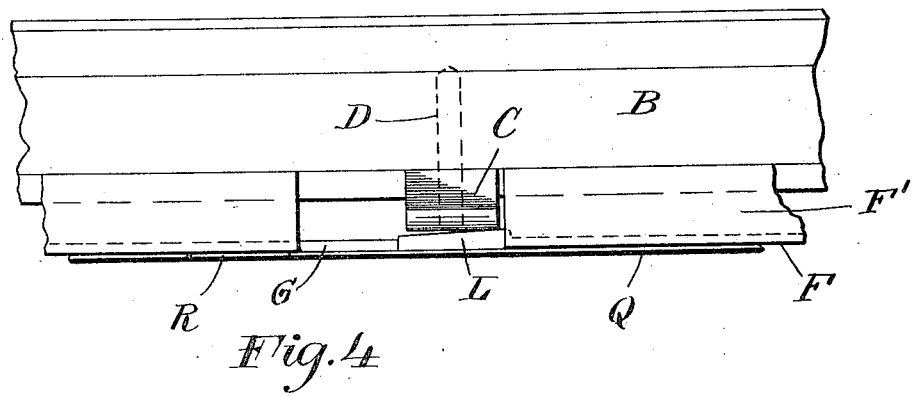

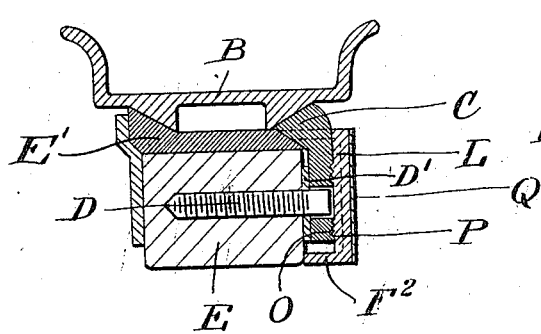
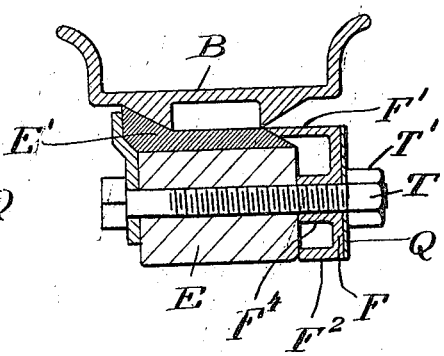
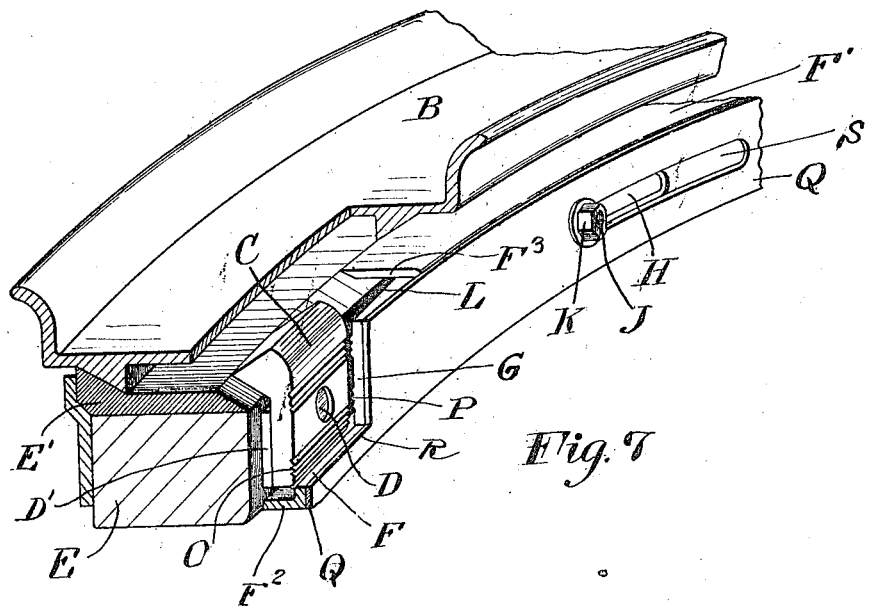

R. G. MASON.
DEMOUNTABLE RIM FOR VEHICLE WHEELS.
APPLICATION FILED OCT. 26, 1916.
1,243,087.
Patented Oct. 16, 1917.
8 SHEETS—SHEET 5.
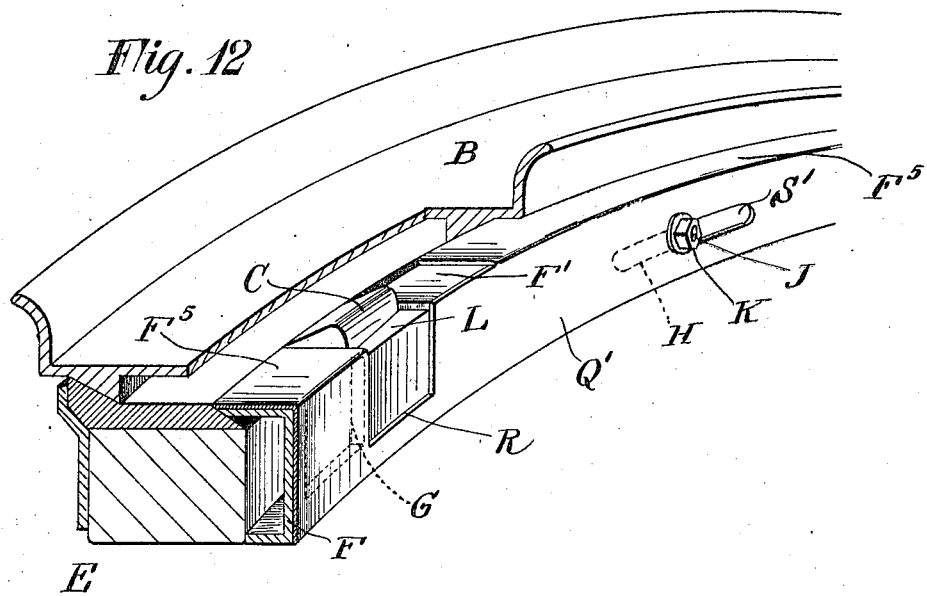
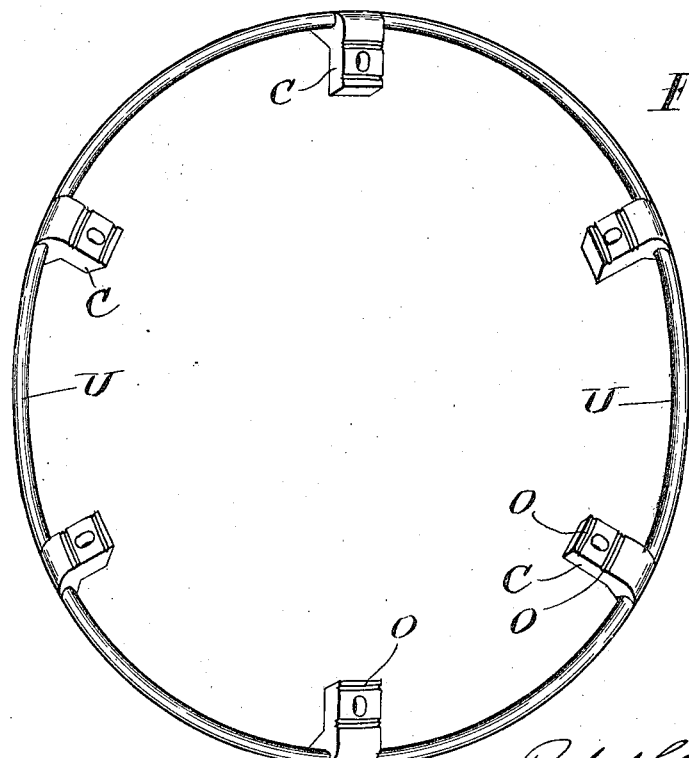
Inventor
Robert G. Mason
By his Attorneys
Ogden & Sheldon

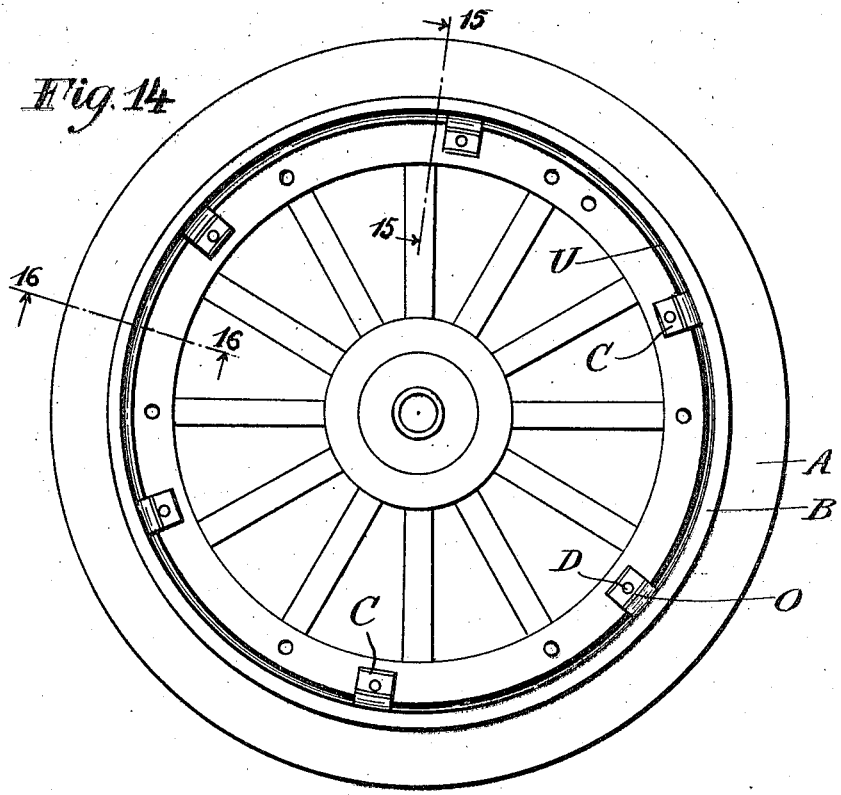
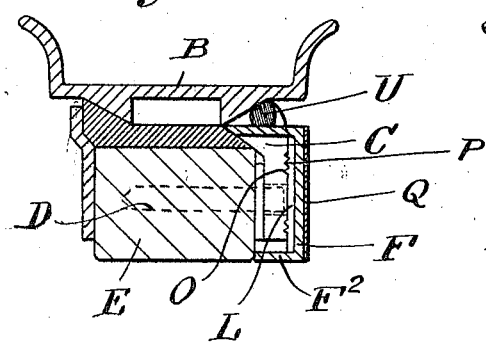
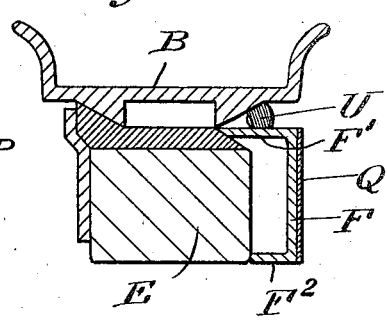

R. G. MASON.
DEMOUNTABLE RIM FOR VEHICLE WHEELS.
APPLICATION FILED OCT. 26, 1916.
1,243,087.
Patented Oct. 16, 1917.
8 SHEETS—SHEET 7.
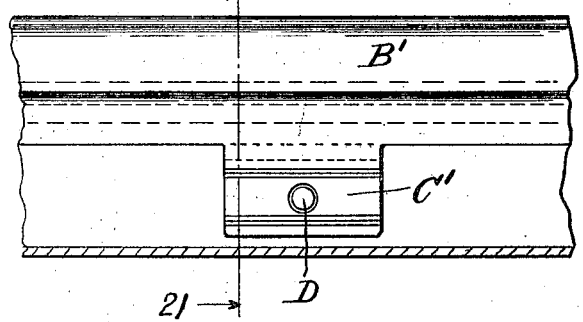
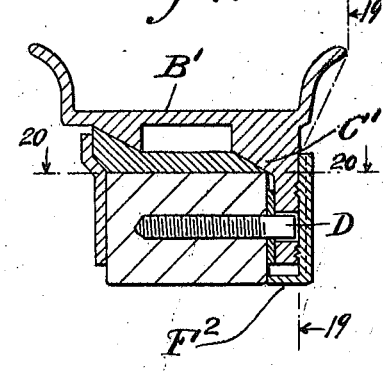
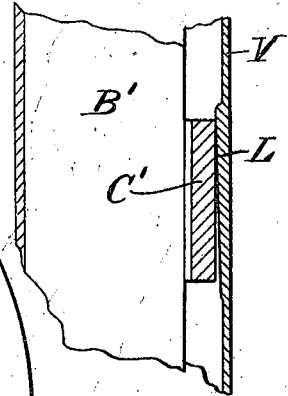
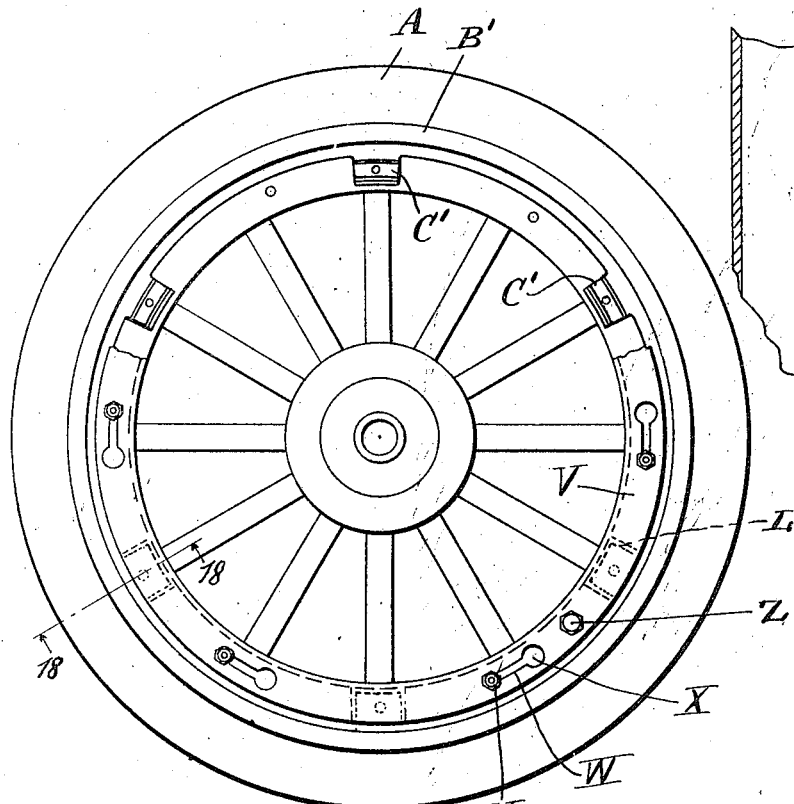
Inventor
Robert G. Mason
By his Attorneys
Ogden & Shelton R. G. MASON.
DEMOUNTABLE RIM FOR VEHICLE WHEELS.
APPLICATION FILED OCT. 26, 1916.

1,243,087.

Patented Oct. 16, 1917.
8 SHEETS—SHEET 8.

UNITED STATES PATENT OFFICE.

ROBERT G. MASON, OF BROOKLYN, NEW YORK.

DEMOUNTABLE RIM FOR VEHICLE-WHEELS.

1,243,087.                Specification of Letters Patent.        Patented Oct. 16, 1917.

Application filed October 26, 1916. Serial No. 127,833.

*To all whom it may concern:*

Be it known that I, ROBERT G. MASON, a citizen of the United States, and a resident of the borough of Brooklyn, county of Kings, city and State of New York, have invented certain new and useful Improvements in Demountable Rims for Vehicle-Wheels, of which the following is a specification, accompanied by drawings.

This invention relates to demountable rims for vehicle wheels, more especially for motor vehicles.

In the usual demountable rim, as now constructed, each clamping lug must be unbolted to remove the rim and separately adjusted and tightened in position when the rim is replaced. A certain amount of time is consumed in these operations and one object of my invention is to avoid the necessity of separately tightening each lug and thus simplify the operations necessary in demounting and mounting the rim when changing tires.

In accordance with my invention, the clamping lugs are all released at once or clamped in locked position at once. I accomplish this object by means of a circumferentially shiftable continuous locking ring mounted at the side of the felly outside or in front of the clamping lugs.

Instead of the usual bolts and nuts for each clamping lug, the lugs are mounted on studs and the locking ring may be provided with openings corresponding to the lugs. By turning the locking ring until the openings are opposite the lugs, the lugs may be loosened and the rim removed. When the lugs are readjusted in position, the locking ring is shifted circumferentially to bring the solid portions of the ring opposite the lugs and lock them in position. Means are also provided for securing the locking ring in locked position. Various means may be provided for carrying out this general principle of operation. The lugs may be either separate and independent or they may form an integral portion of the rim itself. The lugs may also be connected to a ring or otherwise connected together, so that they may all be removed or replaced at the same time. Different forms of locking rings may be provided and if desired, the locking ring itself may be removably mounted at the side of the wheel felly.

Further objects of the invention will hereinafter appear and I have illustrated the preferred forms of the invention, in the accompanying drawings, in which—

Figure 1 is a side view of a wheel, with the demountable rim locked in position;

Fig. 2 is a similar view with the rim in unlocked position;

Fig. 3 is a detail side view of one form of locking ring;

Fig. 4 is an enlarged detail top plan view partly broken away of the demountable rim construction with the parts in locked position;

Fig. 5 is an enlarged detail transverse sectional view through the rim and felly on the line 5—5 of Fig. 1 looking in the direction of the arrows;

Fig. 6 is a similar detail sectional view on the line 6—6 of Fig. 1 looking in the direction of the arrows;

Fig. 7 is a detail perspective view of the rim construction partly in transverse section and partly cut away;

Fig. 8 is a detail top plan view partly in horizontal section and partly broken away of a modified form of rim construction with the parts in unlocked position;

Fig. 9 is a similar view with the parts in locked position, but before the outer protective plate has been adjusted to cover the openings in the locking ring;

Fig. 10 is a similar view with all the parts in final adjustment;

Fig. 11 is a side view partly broken away of the rim construction illustrated in Figs. 8, 9 and 10, with the parts in final adjustment;

Fig. 12 is a detail perspective view of the modified form of rim shown in Figs. 8 to 11, partly in transverse section and partly cut away;

Fig. 13 is an enlarged detail perspective view of a modification in which the clamping lugs are all connected together by means of a ring;

Fig. 14 is a side view of a wheel with the lugs shown in Fig. 13 adjusted in position, but with the clamping ring removed;

Fig. 15 is an enlarged detail transverse sectional view on the line 15—15 of Fig. 14, looking in the direction of the arrows, but with the clamping ring and protective ring or shield in position;

Fig. 16 is a view similar to Fig. 15, on the line 16—16 of Fig. 14, looking in the direction of the arrows;

Fig. 17 is a side view of a wheel showing a modified form of construction in which the clamping lugs are formed integrally with the demountable rim;

Fig. 18 is an enlarged detail transverse sectional view on the line 18—18 of Fig. 17, looking in the direction of the arrows;

Fig. 19 is a detail longitudinal sectional view partly broken away, on the line 19—19 of Fig. 18, looking in the direction of the arrows;

Fig. 20 is a detail horizontal sectional view partly broken away on the line 20—20 of Fig. 18, looking in the direction of the arrows.

Figure 21:
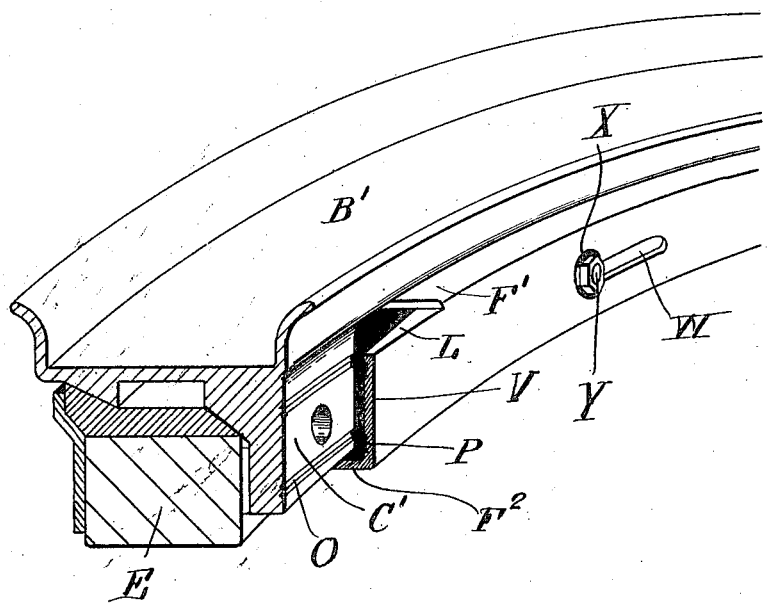
Fig. 21 is a detail perspective view of the modification illustrated in Figs. 17 to 20, partly in transverse section.

Referring to the drawings, and more particularly to the form of the invention shown in Figs. 1 to 7 inclusive, A represents a pneumatic tire carried by the demountable rim B which is shown mounted on the usual felly plate E' on the felly E. The rim is adapted to be held in place by the usual lugs C independent of the rim and loosely mounted, in this instance, on the studs D carried by the felly. Bearing plates D' are preferably provided underneath the lugs. It will be observed that the studs D do not project beyond the outer faces of the lugs and said outer faces are preferably transversely corrugated at O for a purpose to hereinafter appear, although the corrugations may be omitted, if desired.

Outside or in front of the lugs C is mounted a locking ring F and this locking ring is preferably provided with openings G corresponding in number to the lugs C. The locking ring F is so mounted that it may be shifted circumferentially to bring the openings G opposite the lugs C, as shown in Figs. 2 and 7, to unlock or release the lugs and permit the rim B to be removed. By shifting the locking ring F in the opposite direction, solid portions of the ring are brought opposite the lugs C to lock them in clamping position. The locking ring is preferably provided with wedge shaped bearing portions L adjacent the openings G, and these bearing portions are preferably corrugated, as at P, to coöperate with the corrugations O on the lugs and prevent radial movement and rattling of the lugs.

Suitable means for slidably mounting the locking ring, consist of bolts J extending through the felly E and projecting through slots H in the locking ring. These bolts J are provided with the nuts K and may be tightened to a sufficient degree to permit a sliding movement of the locking ring.

The locking ring is also preferably provided with the outer and inner flanges F' and F² extending inwardly toward the felly to prevent dust and dirt from accumulating between the felly and the ring. The outer flange F' is preferably cut away at F³ to permit the sliding movement of the ring.

In order to provide means for covering the openings G when the parts are in locked position, as shown in Figs. 1 and 4, a protective ring or shield Q of light metal, circumferentially slidable independently of the locking ring F, is provided. This outer shield is provided with slots S somewhat longer than the slots H in the locking ring, and the bolts J project through the slots S. The shield Q is provided with the openings R corresponding in number to the openings G in the locking ring and when the locking ring is moved to the position indicated in Figs. 1 and 4 to clamp the lugs in position, the outer protective shield may be moved still farther in the same direction, in order to bring solid portions of the shield opposite the openings G in the locking ring and thus cover said openings.

Suitable means are provided for securing or holding the locking ring F and shield Q in locked position. For this purpose an additional bolt T is provided in the felly adapted to be passed through registering holes in the ring F and shield Q and then tightened in position by means of the nut T'. The locking ring F is preferably provided with an interiorly screw threaded boss or enlargement F⁴ as shown in Fig. 6, to receive the screw threaded end of the bolt T.

Let it be assumed that the rim is to be demounted and that the parts are in locked position, as shown in Fig. 1. The securing bolt T would first be removed or withdrawn sufficiently to permit the locking ring and shield Q to be shifted into the position shown in Figs. 2 and 7, with the respective openings in said ring and shield opposite the lugs C. The lugs may then be loosened or removed and the rim B removed. After having replaced the rim the lugs are adjusted on their studs D, the ring and shield are shifted to locking position and the securing bolt T is readjusted and tightened, and the wheel is ready for use.

In the form of the invention shown in Figs. 8 to 12, a modification of the outer protective shield is illustrated, which is so constructed that it may be shifted to cover not only the openings G in the locking ring F, but also the slots H in the locking ring when the parts are in locked position. This feature is an advantage under some circumstances, in order to prevent mud or dirt from accumulating in the slots H in the locking ring. In this modification the outer shield is also provided with an outer flange F⁵ for covering the openings or gaps over the openings G in the locking ring F.

Figs. 8, 9 and 10 illustrate three positions of the locking ring F and outer shield Q'. The shield Q' is provided with slots S' substantially equal in length to the slots H in the ring F and the openings R in the shield correspond to the openings G in the ring. In Fig. 8 the parts are shown in unlocked position with the openings R and G in the shield and ring respectively opposite the lugs C and the outer flange F⁵ of the shield Q' corresponds to the outer flange F' of the ring F. In the position of the parts shown in Fig. 9, both the ring F and the shield Q' have been moved together to bring the wedge shaped bearing portions L opposite the lugs C and the slots H and openings G in the ring F remain uncovered. In Fig. 10 the shield Q' has been moved back in the opposite direction to bring solid portions of the shield opposite the openings G in slots H in the ring F, and solid portions of the outer flange F⁵ of the shield Q' are brought over the openings G in the ring F. In Fig. 11 a side view of the wheel is shown with the parts in locked position and the slots H and openings G covered by the shield Q'. The modified construction described is best illustrated in Fig. 12, a perspective view, showing how mud and dirt are prevented from accumulating in any portions of the rim construction.

In Figs. 13 to 16 inclusive, the lugs C are shown connected by a ring U so that they may all be removed or replaced at the same time. Otherwise the rim construction is like that shown in Figs. 1 to 7 inclusive. A detail view of the lugs C connected by the ring U is shown in Fig. 13, and in Fig. 14 a side view of a wheel is shown with the lugs in position and before the locking ring and shield Q have been adjusted.

In Figs. 17 to 21 inclusive a modified form of construction is shown in which the lugs C' are formed integral with the demountable rim B'. In this modification the locking ring V is removably mounted on the felly outside the lugs C' and is provided with wedge shaped bearing portions L and the flanges F' and F². The openings in the ring V are omitted in this modification, and the ring is solid throughout, except for the slots W, which are provided with enlarged ends X, in order to permit the slots to be placed over the bolts Y. The ring V is then shifted circumferentially to bring the wedge-shaped bearing portions L opposite the lugs C' and the ring is secured in position by means of the securing bolt Z. In order to remove the rim B', the securing bolt Z is removed, the ring V is shifted until the bolts Y lie in the enlarged portions X of the slots W and the entire ring V is removed, which permits the rim B' to be removed.

It is to be understood that in the modification shown in Figs. 17 to 21, with the lugs C' integral with the rim B', a locking ring and shield with openings corresponding to the lugs could be used as described in connection with the other figures, and obviously the form of locking ring shown in Figs. 17 to 21 could be used with the separate lugs, as shown in the other figures.

One of the important features of my invention resides in the fact that my improved locking means for the lugs of a demountable rim may be applied to existing constructions, already on vehicle wheels. It is only necessary to remove the projecting portions of the lug bolts, so that my locking ring may bear directly upon the lugs. The bolts for the sliding locking ring may be inserted at proper intervals in the felly of the wheel, and it is not necessary to otherwise alter the rim construction. The cost of equipping vehicle wheels with my improvement is therefore brought to a low figure, because especially formed wheels and rims with complicated parts are not necessary.

I claim and desire to obtain by Letters Patent the following:

1. A demountable rim construction for vehicle wheels, comprising in combination with the felly and rim, clamping lugs independent of the rim mounted at the side of the felly, and a continuous locking ring mounted at the side of the felly in front of the lugs, said locking ring having openings corresponding to the lugs, and being shiftable circumferentially to bring either the openings or solid portions of the ring opposite the lugs and thereby release the lugs or lock them in clamping position.

2. A demountable rim construction for vehicle wheels, comprising in combination with the felly and rim, clamping lugs independent of the rim mounted at the side of the felly, and a continuous locking ring mounted at the side of the felly in front of the lugs, said locking ring having openings corresponding to the lugs, and wedge shaped bearing portions inside the ring adjacent the said openings, said ring being shiftable circumferentially to bring either the openings or said bearing portions opposite the lugs and thereby release the lugs or lock them in clamping position.

3. A demountable rim construction for vehicle wheels, comprising in combination with the felly and rim, clamping lugs for the rim mounted at the side of the felly, and a continuous locking ring mounted at the side of the felly in front of the lugs, said locking ring having openings corresponding to the lugs, and wedge shaped bearing portions inside the ring adjacent the said openings, the lugs and wedge shaped bearing portions of the ring being correspondingly corrugated, and said ring being shiftable circumferentially to bring the openings or said bearing portions opposite the lugs and thereby release the lugs or lock them in clamping position.

4. A demountable rim construction for vehicle wheels, comprising in combination with the felly and rim, studs projecting from the side of the felly, clamping lugs for the rim removably mounted on said studs, bolts inserted transversely through the felly, and a locking ring arranged in front of said lugs and having circumferentially extending slots coöperating with said bolts, said ring also having openings corresponding to the lugs, whereby the ring is slidable on the bolts to either bring the openings opposite the lugs for demounting the rim or to bring solid portions of the ring opposite the lugs to lock them in clamping position.

5. A demountable rim construction for vehicle wheels, comprising in combination with the felly and rim, studs projecting from the side of the felly, clamping lugs for the rim removably mounted on said studs, bolts inserted transversely through the felly, and a locking ring arranged in front of said lugs and having circumferentially extending slots coöperating with said bolts, said ring also having openings corresponding to the lugs, whereby the ring is slidable on the bolts to either bring the openings opposite the lugs for demounting the rim or to bring solid portions of the ring opposite the lugs to lock them in clamping position, and an additional bolt adapted to pass through the locking ring and felly for securing the ring in locked position.

6. A demountable rim construction for vehicle wheels, comprising in combination with the felly and rim, clamping devices for the rim mounted at the side of the felly, and locking means for the clamping devices in the form of a circumferentially shiftable ring mounted at the side of the felly and adapted to lock or release the clamping devices, said locking ring having protective flanges extending inwardly toward the felly.

7. A demountable rim construction for vehicle wheels, comprising in combination with the felly and rim, clamping lugs for the rim mounted at the side of the felly, and a continuous locking ring mounted at the side of the felly in front of the lugs, said locking ring having openings corresponding to the lugs, and being shiftable circumferentially to bring either the openings or solid portions of the ring opposite the lugs and thereby release the lugs or lock them in clamping position, and protective flanges on the locking ring extending inwardly toward the felly.

8. A demountable rim construction for vehicle wheels, comprising in combination with the felly and rim, clamping lugs for the rim mounted at the side of the felly, and a continuous locking ring mounted at the side of the felly in front of the lugs, said locking ring having openings corresponding to the lugs, and circumferentially extending slots, bolts passing through said slots into the felly, whereby the locking ring is slidable on the bolts to bring either the openings or solid portions of the ring opposite the lugs to release the lugs or lock them in position, and a circular protective shield also slidable on the said bolts adapted to cover the openings in the locking ring when in locked position.

9. A demountable rim construction for vehicle wheels, comprising in combination with the felly and rim, clamping lugs for the rim mounted at the side of the felly, and a continuous locking ring mounted at the side of the felly in front of the lugs, said locking ring having openings corresponding to the lugs, and circumferentially extending slots, bolts passing through said slots into the felly, whereby the locking ring is slidable on the bolts to bring either the openings or solid portions of the ring opposite the lugs to release the lugs or lock them in position, and a circular protective shield also slidable on the said bolts and adapted to cover both the openings and the slots in the locking ring when in locked position.

In testimony whereof I have signed this specification in the presence of two subscribing witnesses.

ROBERT G. MASON.

Witnesses:
A. C. PARHAM,
M. M. RIEMANN.